US006832635B2

(12) United States Patent
Kruger

(10) Patent No.: US 6,832,635 B2
(45) Date of Patent: Dec. 21, 2004

(54) RAINWATER COLLECTION AND BOTTLING SYSTEM

(76) Inventor: Jan Andreas Adriaan Kruger, Lake Buena Vista, Gordon Avenue, Centurion (ZA)

( * ) Notice: Subject to any disclaimer, the term of this patent is extended or adjusted under 35 U.S.C. 154(b) by 134 days.

(21) Appl. No.: 10/444,137

(22) Filed: May 23, 2003

(65) Prior Publication Data

US 2004/0200542 A1 Oct. 14, 2004

(30) Foreign Application Priority Data

Apr. 11, 2003 (ZA) .......................................... 2003/2867

(51) Int. Cl.$^7$ ................................................ B67C 3/02
(52) U.S. Cl. ........................... 141/115; 141/86; 141/88; 210/513
(58) Field of Search ............................. 141/85–88, 115, 141/126, 340; 210/172, 513, 532.1, 533–535, 540

(56) References Cited

U.S. PATENT DOCUMENTS

| | | | |
|---|---|---|---|
| 5,407,091 A | 4/1995 | Wallis | |
| 5,536,409 A | * 7/1996 | Dunkers | ...................... 210/519 |
| 5,800,717 A | 9/1998 | Ramsay et al. | |
| 6,182,680 B1 | 2/2001 | Hart | |
| 6,264,832 B1 | 7/2001 | Panahi | |
| 6,277,285 B1 | 8/2001 | Vion | |
| 6,383,370 B1 | 5/2002 | Keever et al. | |
| 6,406,620 B1 | 6/2002 | Rogers | |
| 6,436,283 B1 | 8/2002 | Duke | |

FOREIGN PATENT DOCUMENTS

JP 6-315689 11/1994

* cited by examiner

Primary Examiner—Timothy L Maust
(74) Attorney, Agent, or Firm—Burns, Doane, Swecker & Mathis, LLP

(57) ABSTRACT

Rainwater collection apparatus having a tank with a catchment cone above it. Between an outlet at the bottom of the cone and an inlet at the top of the tank is a sediment trap which has an annular chamber. An inlet pipe with openings near its upper end extends into the chamber, so that when the chamber overflows in use, the container is filled. Drain valves permit flushing of the sediment trap. The apparatus may form part of a system includes storage, purification and bottling equipment.

12 Claims, 2 Drawing Sheets

RAINWATER COLLECTION AND BOTTLING SYSTEM

This application claims priority under 35 U.S.C. §§ 119 and/or 365 to Patent Application Serial No. 2003/2867 filed in South Africa on Apr. 11, 2003, the entire content of which is hereby incorporated by reference.

BACKGROUND OF THE INVENTION

THIS invention relates to apparatus for collecting and bottling rainwater.

The collection of rainwater for drinking, gardening and other domestic purposes is well known. Typically, a water tank is arranged to be fed by a downpipe which channels water from a sloping roof into the tank. The tank is provided with a tap to allow stored rainwater to be drawn off.

Rainwater collected in this way is of dubious purity, and is likely to be contained by airborne dirt and dust which has collected on the roof, plant matter such as leaves and pollen, insects, bird and animal droppings, and industrial pollutants.

It is an object of the invention to provide an alternative system for collecting rainwater.

SUMMARY OF THE INVENTION

According to the invention there is provided rainwater collection apparatus comprising:

a container having an inlet and an outlet;

a catchment element having an outlet and defining a surface shaped to receive rainwater and to channel it towards the outlet; and a sediment trap disposed between the outlet of the catchment element and the inlet of the container, the sediment trap comprising a chamber in communication with the outlet of the catchment element and the inlet of the container and extending below the level of the inlet of the container, so that rainwater flowing from the outlet of the catchment element flows into the chamber of the sediment trap, and then into the container when the rainwater in the chamber overflows through the inlet of the container.

The catchment element may be a cone supported above the container,

Preferably, the cone has a diameter equal to or greater than that of the container.

The cone and the container may be incorporated in a free-standing structure.

In an alternative embodiment, the catchment element may comprise a flexible sheet supported on a substrate shaped to define a rainwater receiving and channeling surface.

The substrate may be the ground, the container then being sunken into the ground below the catchment element.

The sediment trap may comprise an annular chamber disposed about the inlet of the container.

The inlet of the container may be formed in a conduit disposed within the chamber and comprise at least one opening in a side wall of the conduit.

The apparatus may include at least one drainage conduit in communication with the chamber of the sediment trap, and a valve arranged to control liquid flow through the drainage conduit.

Preferably, the valve is electrically controlled.

The apparatus may include a first liquid flow sensor arranged to detect a flow of liquid from the chamber into the drainage conduit and to generate an output signal in response thereto, and a controller responsive to the output signal to open the valve to flush the chamber for a period of time and then to close the valve again.

The apparatus may further include a second liquid flow sensor arranged to detect a flow of liquid from the chamber into the inlet of the container and to generate an output signal in response thereto, the controller being responsive to the output signal to open the valve for a period of time and then to close the valve again thereby to drain the chamber when the flow of liquid into the inlet of the container ceases.

The invention extends to a rainwater collection and bottling system comprising rainwater collection apparatus as defined above, at least one storage container for receiving rainwater from the rainwater collection apparatus, purification apparatus for purifying the rainwater, and a bottling plant for bottling the purified rainwater.

The system may further include carbonation apparatus for carbonating the purified rainwater.

DESCRIPTION OF EMBODIMENTS

The present invention is aimed at the collection of rainwater in bulk, and the purification and bottling thereof. However, the rainwater collection apparatus described below could be employed on a smaller scale, for example, for domestic purposes.

Figure 1:
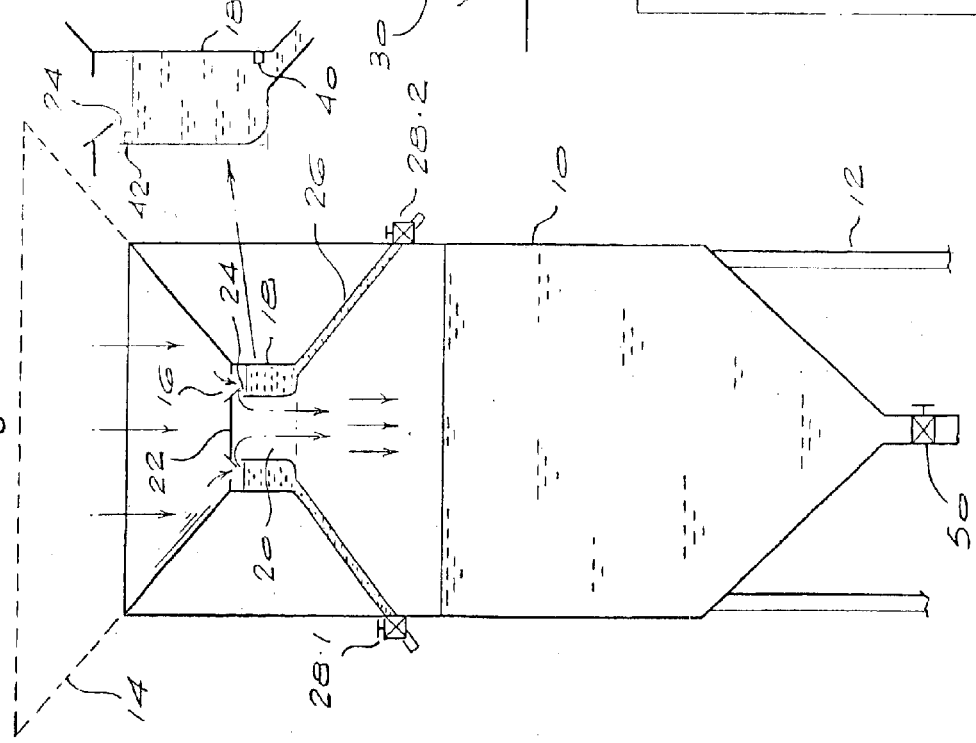
FIG. 1 is a sectional schematic view of rainwater collection apparatus of the invention.

Referring first to FIG. 1, the rainwater collection apparatus comprises a tank 10 which is supported above the ground on a frame 12. The tank 10 will typically be fairly large, for example of the order of 5 000 to 10 000 liters in capacity, and is constructed from a food grade material such as high density polyethylene or stainless steel. The tank has an outlet 50 controlled by a valve.

Above the tank 10 and supported by the cylindrical wall thereof is a catchment element in the form of a cone 14, which defines a surface for receiving rainwater and for channeling it towards the truncated tip of the cone, in which an annular outlet 16 is formed. In an alternative embodiment, the cone may have a diameter which is substantially greater than that of the tank 10, as indicated by the broken line in FIG. 1.

Below the outlet 16 is a sediment trap comprising an annular chamber 18 into which an inlet pipe 20 of the container protrudes from below. The upper end 22 of the pipe 20 is sealed, but a set of apertures 24 in the side walls of the pipe 20 adjacent the upper end thereof communicate with the annular interior of the chamber 18. From the lower end of the chamber 18, a pair of drainage pipes 26 extend outwardly and terminate at the outer wall of the container 10 in first and second solenoid-controlled valves 28.1 and 28.2 which permit periodic flushing and draining of the sediment trap. The chamber 18 has smoothly rounded inner surfaces to prevent the collection of dirt.

Located within the chamber 18 are first and second liquid flow sensors or flow switches 40 and 42. The first flow switch 40 is located adjacent the upper end of one of the drainage pipes 26 and is arranged to detect a flow of liquid into the drainage pipe 26. The second flow switch 42 is located at the upper inner edge of the chamber 18, adjacent to an aperture 24, and is arranged to sense a flow of liquid from the chamber 18 through the aperture 24 into the inlet pipe 20 of the container.

Figure 3:
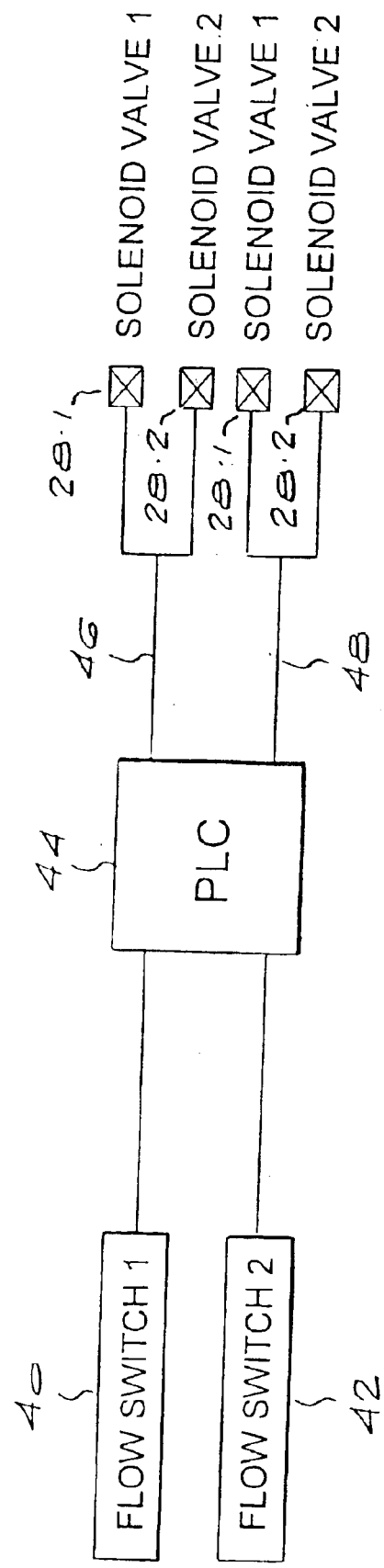
FIG. 3 is a simplified block schematic diagram of a valve control circuit associated with the apparatus of FIG. 1.

Referring now to FIG. 3, outputs of the first and second flow switches 40 and 42 are connected to respective inputs of a programmable logic controller (PLC) 44 which has outputs 46 and 48 connected to the first and second solenoid valves 28.1 and 28.2.

Assuming that the chamber 18 and the drainage pipes 26 are empty, rainwater falling into the collection cone and being channeled into the chamber 18 will flow across the first flow switch 40 into the drainage pipe 26, and this flow is thus detected by the PLC 44. The PLC responds by activating its output 46 to open both the first and second solenoid valves 28.1 and 28.2 for a predetermined period programmed into the PLC and then to close the valves 28.1 and 28.2 again. This period is selected to ensure sufficient flushing of accumulated dust or other foreign matter in the collection cone and the chamber 18 before collection of rainwater begins. The valves are then closed.

Once the sediment trap 18 has been flushed and the solenoid valves 28.1 and 28.2 are closed, rainwater received by the catchment cone 14 will flow into the sediment trap until it reaches the level of the openings 24 in the pipe 20, and will then flow into the container 10.

The second flow sensor 42 detects and monitors the flow of water into the container 10. As soon as water stops flowing across this flow sensor, indicating either that rain has ceased to fall or that the container 10 is full, the PLC activates its second output 48 to open the first and second solenoid valves 28.1 and 28.2 for a predetermined period and then to close the valves 28.2 and 28.2 again. This serves to empty remaining water from the sediment trap, preventing contamination of the collected rainwater in the container 10 which could occur if more rain should fall after debris has fallen into the remaining water.

Figure 2:
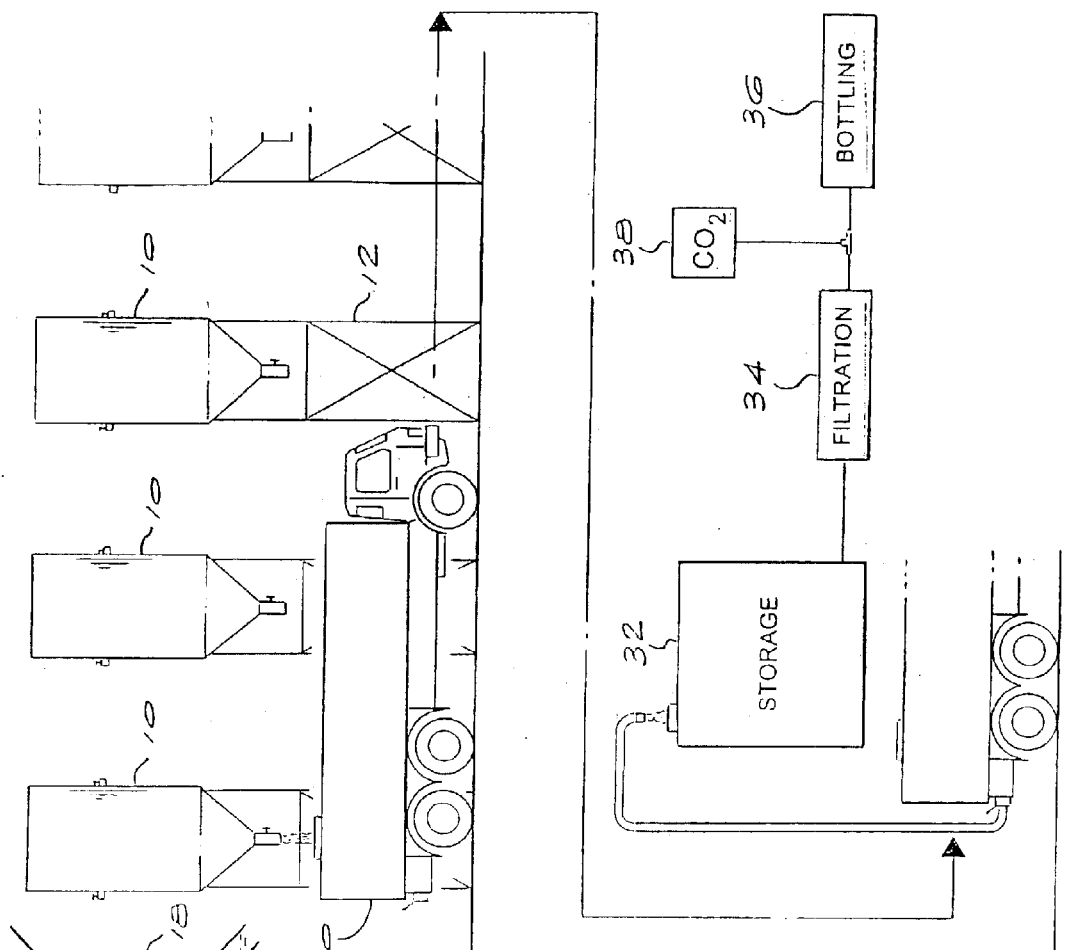
FIG. 2 is a schematic diagram illustrating several of the rainwater collection apparatus arranged in conjunction with a purification and bottling plant.

Referring now to FIG. 2, a number of containers 10 are shown, arranged together in a "farm". A food grade tanker 30 is used to collect the contents of the containers and to transport it to a storage, filtration and bottling plant. This plant can be located at the same site as the container farm, or remotely.

The contents of the tanker 30 are pumped into a storage tank 32, which is also a food grade tank. The storage tank 32 (or a number of such tanks) is preferably housed in a closed area which is maintained under positive pressure, to avoid the ingress of dust into the storage area.

From the storage tank 32, the rainwater is pumped through a filtration/purification system 34 and thence to a bottling plant 36. A carbonation system 38 can be provided if carbonated water is required.

The purified and optionally carbonated rainwater is then bottled in a conventional manner.

Instead of a rigid cone fixed to and supported by the rainwater container 10, other arrangements are possible. For example, to obtain a large catchment element, a sheet of flexible plastics material can be laid on a substrate, which has been shaped to define the necessary rainwater collection surface. The substrate could be a specially constructed frame, a concrete pan, or even the ground, with the container 10 being sunken into the ground below the catchment element. It will be appreciated that the rainwater collection apparatus described above should preferably be located in an area which is free from significant environmental and industrial pollutants, to ensure that the degree of purification required is minimal. By locating the apparatus in a suitable area, an essentially limitless supply of good quality water can be obtained.

I claim:

1. Rainwater collection apparatus comprising:
   a container having an inlet and an outlet;
   a catchment element having an outlet and defining a surface shaped to receive rainwater and to channel it towards the outlet;
   a sediment trap disposed between the outlet of the catchment element and the inlet of the container, the sediment trap comprising an annular chamber disposed about the inlet of the container in communication with the outlet of the catchment element and the inlet of the container and extending below the level of the inlet of the container, so that rainwater flowing from the outlet of the catchment element flows into the chamber of the sediment trap, and then into the container when the rain water in the chamber overflows through the inlet of the container; and
   at least one drainage conduit in communication with the chamber of the sediment trap, with a valve arranged to control liquid flow through the drainage conduit, to permit periodic flushing and cleaning of the sediment trap.

2. Rainwater collection apparatus according to claim 1 wherein the catchment element is a cone supported above the container.

3. Rainwater collection apparatus according to claim 2 wherein the cone has a diameter equal to or greater than that of the container.

4. Rainwater collection apparatus according to claim 2 wherein the cone and the container are incorporated in a free-standing structure.

5. Rainwater collection apparatus according to claim 1 wherein the catchment element comprises a flexible sheet supported on a substrate shaped to define a rainwater receiving and channeling surface.

6. Rainwater collection apparatus according to claim 5 wherein a substrate is the ground, the container being sunken into the ground below the catchment element.

7. Rainwater collection apparatus according to claim 1 wherein the inlet of the container is formed in a conduit disposed within the chamber and comprises at least one opening in a side wall of the conduit.

8. Rainwater collection apparatus according to claim 1 wherein the valve is electrically controlled.

9. Rainwater collection apparatus according to claim 8 including a first liquid flow sensor arranged to detect a flow of liquid from the chamber into the drainage conduit and to generate an output signal in response thereto, and a controller responsive to the output signal to open the valve to flush the chamber for a period of time and then to close the valve again.

10. Rainwater collection apparatus according to claim 9 further including a second liquid flow sensor arranged to detect a flow of liquid from the chamber into the inlet of the container and to generate an output signal in response thereto, the controller being responsive to the output signal to open the valve for a period of time and then to close the valve again thereby to drain the chamber when the flow of liquid into the inlet of the container ceases.

11. A rainwater collection and bottling system comprising;
   a container having an inlet and an outlet;
   a catchment element having an outlet and defining a surface shaped to receive rainwater and to channel it towards the outlet;

a sediment trap disposed between the outlet of the catchment element and the inlet of the container, the sediment trap comprising an annular chamber disposed about the inlet of the container in communication with the outlet of the catchment element and the inlet of the container and extending below the level of the inlet of the container, so that rainwater flowing from the outlet of the catchment element flows into the chamber of the sediment trap, and then into the container when the rainwater in the chamber overflows through the inlet of the container, at least one storage container for receiving rainwater from the rainwater collection apparatus;

purification apparatus for purifying the rainwater; and a bottling plant for bottling the purified rainwater.

12. A rainwater collection and bottling system according to claim 11 further including carbonation apparatus for carbonating the purified rainwater.

* * * * *